US011802953B2

United States Patent
Brown (10) Patent No.: US 11,802,953 B2
(45) Date of Patent: Oct. 31, 2023

(54) ADAPTIVE ALGORITHMS FOR INTERROGATING THE VIEWABLE SCENE OF AN AUTOMOTIVE RADAR

(71) Applicant: Waymo LLC, Mountain View, CA (US)

(72) Inventor: Adam Brown, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 142 days.

(21) Appl. No.: 17/369,367

(22) Filed: Jul. 7, 2021

(65) Prior Publication Data

US 2021/0333383 A1 Oct. 28, 2021

Related U.S. Application Data

(63) Continuation of application No. 16/251,732, filed on Jan. 18, 2019, now Pat. No. 11,067,681, which is a
(Continued)

(51) Int. Cl.
*G01S 13/42* (2006.01)
*G01S 13/10* (2006.01)
(Continued)

(52) U.S. Cl.
CPC .............. *G01S 13/42* (2013.01); *G01S 13/10* (2013.01); *G01S 13/34* (2013.01); *G01S 13/931* (2013.01);
(Continued)

(58) Field of Classification Search
CPC .............................. G01S 7/2923; G01S 13/20
See application file for complete search history.

(56) References Cited

U.S. PATENT DOCUMENTS 3,603,996 A 9/1971 Murchison
3,611,370 A 10/1971 Frasure
(Continued)

FOREIGN PATENT DOCUMENTS

JP 2011242288 A * 12/2011 ............. G01S 13/42

OTHER PUBLICATIONS

Zhang Jianhui, Liu Guosui, Gu Hong, Su Weimin . Multi-slope stepped-FMCW waveform applied for automotive collision warning radar[J]. Journal of Electronics & Information Technology, 2002, 24(2): 232-237; Institute of Electronics, Chinese Academy of Sciences; Peking, People's Republic of China. (Year: 2002).*

*Primary Examiner* — Bernarr E Gregory
(74) *Attorney, Agent, or Firm* — McDonnell Boehnen Hulbert & Berghoff LLP (57) ABSTRACT

A radar system in an autonomous vehicle may be operated in various modes and with various configurations. In one example, the radar system determines a target range for further interrogation. The target range may be determined based on the radar system transmitting a first electromagnetic radiation signal and receiving a first reflected electromagnetic signal radiation signal. After the radar system determines a target range, it transmits a second electromagnetic radiation signal. Additionally, the radar system receives a reflected electromagnetic signal radiation based on the transmission. After receiving the reflected signal, the radar system can process the reflected signal to only have components associated with the target range. The processing of the reflected signal may create a processed signal. Finally, the radar system may determine at least one parameter of a target object based on the processed signal.

20 Claims, 8 Drawing Sheets

Related U.S. Application Data continuation of application No. 14/994,902, filed on Jan. 13, 2016, now Pat. No. 10,222,462, which is a continuation-in-part of application No. 13/778,722, filed on Feb. 27, 2013, now Pat. No. 9,261,590.

(51) Int. Cl.
  *G01S 13/34* (2006.01)
  *G01S 13/931* (2020.01)
  *G01S 13/86* (2006.01)

(52) U.S. Cl.
  CPC ............ *G01S 13/86* (2013.01); *G01S 13/862* (2013.01); *G01S 13/865* (2013.01); *G01S 13/867* (2013.01); *G01S 2013/93271* (2020.01); *G01S 2013/93275* (2020.01)

(56) References Cited

U.S. PATENT DOCUMENTS

| | | | |
|---|---|---|---|
| 3,688,313 A | 8/1972 | Kern | |
| 3,828,348 A * | 8/1974 | Murray, Jr. | ............ G01S 13/20 342/160 |
| 3,849,779 A | 11/1974 | Boyd | |
| 3,949,396 A | 4/1976 | Cantrell | |
| 4,000,490 A | 12/1976 | Lader | |
| 4,003,049 A | 1/1977 | Sterzer | |
| 4,630,052 A | 12/1986 | Galati | |
| 4,633,198 A | 12/1986 | Goetz | |
| 5,191,337 A | 3/1993 | Brovko | |
| 5,270,720 A | 12/1993 | Stove | |
| 5,325,097 A | 6/1994 | Zhang | |
| 5,351,055 A | 9/1994 | Fujikawa | |
| 5,499,195 A | 3/1996 | Castelaz | |
| 5,517,197 A | 5/1996 | Algeo | |
| 5,646,612 A | 7/1997 | Byon | |
| 5,737,307 A | 4/1998 | Nakatani | |
| 5,745,437 A | 4/1998 | Wachter | |
| 5,751,240 A | 5/1998 | Fujita | |
| 6,147,638 A | 11/2000 | Rohling | |
| 6,366,236 B1 | 4/2002 | Farmer | |
| 6,426,717 B1 | 7/2002 | Maloratsky | |
| 6,839,019 B2 | 1/2005 | Noda | |
| 6,873,250 B2 | 3/2005 | Viana | |
| 7,034,743 B2 | 4/2006 | Nakanishi | |
| 7,324,041 B1 | 1/2008 | Weatherford | |
| 7,796,081 B2 | 9/2010 | Breed | |
| 8,169,360 B1 | 5/2012 | Weatherford | |
| 8,223,064 B2 | 7/2012 | Szajnowski | |
| 8,410,976 B2 | 4/2013 | Szajnowski | |
| 8,717,230 B1 | 5/2014 | Fischi | |
| 9,428,186 B2 | 8/2016 | Breed | |
| 2003/0083818 A1 | 5/2003 | Tojima | |
| 2005/0225481 A1 | 10/2005 | Bonthron | |
| 2006/0125680 A1 | 6/2006 | Thackray | |
| 2007/0182622 A1 | 8/2007 | Weatherford | |
| 2010/0026555 A1 | 2/2010 | Whittaker | |
| 2012/0235855 A1 | 9/2012 | Kurtz | |

\* cited by examiner

ADAPTIVE ALGORITHMS FOR INTERROGATING THE VIEWABLE SCENE OF AN AUTOMOTIVE RADAR

CROSS REFERENCE TO RELATED APPLICATIONS

This application is a continuation of and claims priority to U.S. patent application Ser. No. 16/251,732, filed Jan. 18, 2019, now U.S. Pat. No. 11,067,681, which is a continuation of and claims priority to U.S. patent application Ser. No. 14/994,902, filed Jan. 13, 2016, now U.S. Pat. No. 10,222,462, which is continuation-in-part of and claims priority to U.S. patent application Ser. No. 13/778,722, filed Feb. 27, 2013, now U.S. Pat. No. 9,261,590, the disclosure of each is hereby incorporated by reference.

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

In order to aid the vehicle control system, an autonomous vehicle may include a radar system. The radar system may be operated in various modes and with various configurations based on the intended use and operating conditions.

In a first embodiment, a method for operating a radar system is provided. The radar system determines a target range. The target range may be determined based on the radar system transmitting a first electromagnetic radiation signal and receiving a first reflected electromagnetic signal radiation signal. The radar system transmits a second electromagnetic radiation signal. Additionally, the radar system receives a reflected electromagnetic signal radiation based on the transmitted second electromagnetic radiation signal. After receiving the reflected signal, the radar system can process the reflected signal to only have components associated with the target range. The processing of the reflected signal may create a processed signal. Finally, the radar system may determine at least one parameter of a target object based on the processed signal.

In a second embodiment, a radar system is provided. The radar system is configured with an antenna system configured to transmit and receive electromagnetic radiation. Additionally, the radar system has a transceiver. The transceiver is configured to cause the antenna system to (i) transmit a first electromagnetic radiation signal and (ii) receive a first reflected electromagnetic signal radiation based on the first transmitted electromagnetic radiation signal. Additionally, the transceiver causes the antenna system to (i) transmit a second electromagnetic radiation signal and (ii) receive a second reflected electromagnetic signal radiation based on the second transmitted electromagnetic radiation signal. Moreover, the radar system includes a processing unit. The processing unit is configured to (i) determine a target range based on the first reflected electromagnetic radiation signal and (ii) process the received second reflected electromagnetic signal to only have components associated with the target range to provide a processed signal. Furthermore, the processing unit is also configured to determine at least one parameter of the target object based on the processed signal.

In a third embodiment, an article of manufacture including a non-transitory computer-readable medium having program instructions stored thereon is provided. When the program instructions are executed by a processor in a radar system, cause the radar system to perform operations. The operations include determining a target range and transmitting a second electromagnetic radiation signal. Additionally, the operations include receiving a reflected electromagnetic signal radiation based on the transmitted electromagnetic radiation signal. The operations further include processing the received reflected electromagnetic signal to only have components associated with the target range to provide a processed signal. Finally, the operations include determining at least one parameter of the target object based on the processed signal.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

1. Overview

Example embodiments disclosed herein relate to a radar system including a range dwell mode in an autonomous vehicle. Further, the embodiments disclosed herein may also be used to optimize the radar system based on a target region of interest.

The radar system of the autonomous vehicle may feature a plurality of antennas. Each antenna may be configured to (i) transmit electromagnetic signals, (ii) receive electromagnetic signals, or (iii) both transmit and receive electromagnetic signals. The antennas may form an array of antenna elements. The array may be able to steer a beam formed by the transmitted electromagnetic signals. Additionally, the array may aid in detecting the range from which electromagnetic signals are received.

Radar systems transmit an electromagnetic signal and receive reflections of the electromagnetic signal from various objects within a field of view of the radar system. Various objects will reflect the electromagnetic signal differently. For example, larger objects may reflect a larger amount of the electromagnetic signal. Smaller objects may reflect less of the electromagnetic signal. However, in some instances, a large object may cause a large enough reflection that some of the reflections from smaller objects may be overwhelmed. Thus, it may be desirable to minimize the impact of the reflections from large objections.

Some conventional radar systems use beam steering to minimize the impact of undesirable reflections. When a radar system uses beam steering, the transmitted beam may be steered away from the location of the undesirable reflection. Beam steering may also be used to mathematically remove signals from undesirable directions in received signals. However, beam steering may not produce desirable results in several situations. For example, if the reflecting object reflects enough signal, even beam steering may not mitigate the reflections. Further, target objects may be located near the large reflecting object. Thus, it may not be possible to steer the beam away from the large reflecting object.

However, by operating the radar in a range dwell mode, the undesired reflections may be reduced or mitigated. In one embodiment, the radar system may identify a range of interest. The radar system may only process signals corresponding to the range of interest. In another embodiment, the radar system may identify an undesired range. The radar system may operate by not processing signals corresponding to the undesired range. Thus, the reflections from undesirable objects may be removed from the radar system based on the range of the target objects and the undesirable objects.

Within the context of the disclosure, the vehicle could be operable in various modes of operation. Depending on the embodiment, such modes of operation could include manual, semi-autonomous, and autonomous modes. In particular, the autonomous mode may provide driving operation with little or no user interaction. Manual and semi-autonomous modes of operation could provide for driving operations with a greater degree of user interaction.

Additionally, the vehicle could be operated in a safety mode. The safety mode could represent an autonomous, semi-autonomous, or manual mode in which the vehicle may be controlled to operate in a safe fashion. Such safety modes of operation could include the vehicle autonomously pulling over to the side of a road and/or the vehicle returning some or all operational control of the vehicle to a driver or another control system.

Some methods disclosed herein could be carried out in part or in full by a vehicle configured to operate in an autonomous mode with or without external interaction (e.g., such as from a user of the vehicle). In one such example, the vehicle may feature a radar system. The radar system may be used for several different purposes. The navigation system of the vehicle may use the radar to locate objects in the path of the vehicle. Additionally, the radar may be used to locate and/or help identify other objects near the vehicle.

During the operation of the radar, at least one antenna in the radar system may transmit a radio signal. The transmitted radio signal may propagate away from the antenna and may be reflected by various objects. The reflected radio signals may be received by at least one antenna in the radar system. The radar system may additionally have a processing unit configured to process the received reflected radio signals. Based on the received reflected radio signals, the processing unit may be able to locate the objects that caused the reflections. The processing unit may be able to calculate an angle and a distance to each object that reflected the radio signal.

In some embodiments, the radar may be configured with multiple antennas. By having multiple antennas, the radar system may have more control over the radar beam. For example, the radar system may be able to adjust the beam width and/or direction. Having more control over the radar beam allows the radar system to more accurately locate objects. In one embodiment, a plurality of antennas may be arranged in an array. The antenna elements in the array may have an even spacing between elements (i.e. the distance between each element is the same) or the antenna may have a non-even spacing. Additionally, the array may be a linear array, a two dimensional array, three dimensional array, conformal array, or other array configuration.

The radar system may also include a computer processor. The processor may be configured to calculate some parameters of objects within the field of view of the radar system either before the operation of the radar or during the operation of the radar. For example, in one embodiment, the processor is configured to calculate the distance (and angle) to various objects in the field of view of the radar. The distance may correspond to a time delay and/or a frequency shift with which a reflected radio signal returns to the antennas. Additionally, the radar system may be configured to determine whether each reflecting object is desirable or undesirable. Based on the determination of desirable and undesirable objects, the processor may determine a range of interest. The range of interest may correspond to a range of distance in which all the desired object are located. The range of interest may also correspond to a range of angles in which all the desired object are located. Further, the range of interest may correspond to a range of distance and angles in which none the undesired object are located.

In some embodiments, the processor may operate the radar system in a FMCW mode after a range of interest is identified. By operating the radar in an FMCW mode, the radar system can remove signals that do not correspond to the region of interest. Additionally, in some embodiments, the processor may also steer the radar beam away from undesirable targets. Thus, the processor may operate in a way to reduce the presence of undesired signals. By determining a region of interest and further interrogating the region (while removing undesirable information), a higher quality signal from the region of interest can be obtained.

A server, such as one or more nodes of a server network, could additionally (or alternatively) carry out the methods disclosed herein in part or in full. In an example embodiment, a server or computer may receive an indication of an operation mode of the radar system. Such indications could include any current parameters of the antenna system (e.g., operation frequency, reflected signal information, the on/off state of each antenna). Further, the server may already know (or receive) information related to the position of various objects with respect to the vehicle. Such information could aid in the determination of the region of interest.

Also disclosed herein are non-transitory computer readable media with stored instructions. The instructions could be executable by a computing device to cause the computing device to perform functions similar to those described in the aforementioned methods.

It is understood that there are many different specific methods and systems that could be used in an unambiguous angle calculation for the radar system. These specific methods and systems are contemplated herein, and several example embodiments are described below.

2. Example Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

Figure 1:
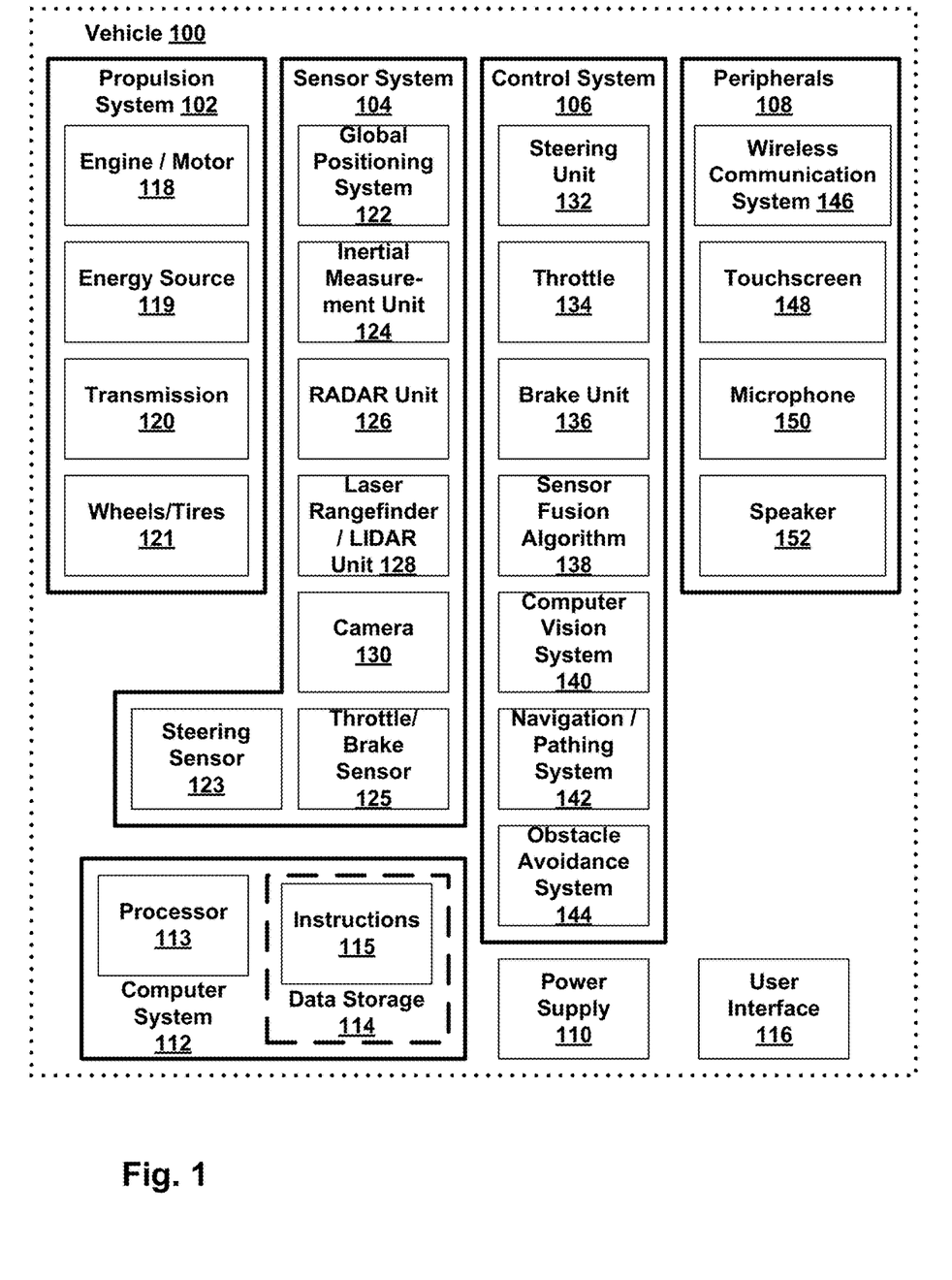
FIG. 1 is a functional block diagram illustrating a vehicle, according to an example embodiment.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to transmit a radio signal, receive reflected radio signals with at least one antenna in the radar system, process the received reflected radio signals, locate the objects that caused the reflections, calculate an angle and a distance to each object that reflected the radio signal, and calculate an unambiguous angle associated with the angle. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

The computer system 112 could carry out several determinations based on the indications received from the input- and output-indication sensors. For example, the computer system 112 could calculate the direction (e.g. angle) and distance (e.g. range) to one or more objects that are reflecting radar signals back to the radar unit 126. Additionally, the computer system 112 could calculate a range of interest. The range of interest could, for example, correspond to a region where the computer system 112 has identified one or more targets of interest. Additionally or additionally, the computer system 112 may identify one or more undesirable targets. Thus, a range of interest may be calculated so as not to include undesirable targets.

In some embodiments, the computer system 112 may make a determination about various objects based on data that is provided by systems other than the radar system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
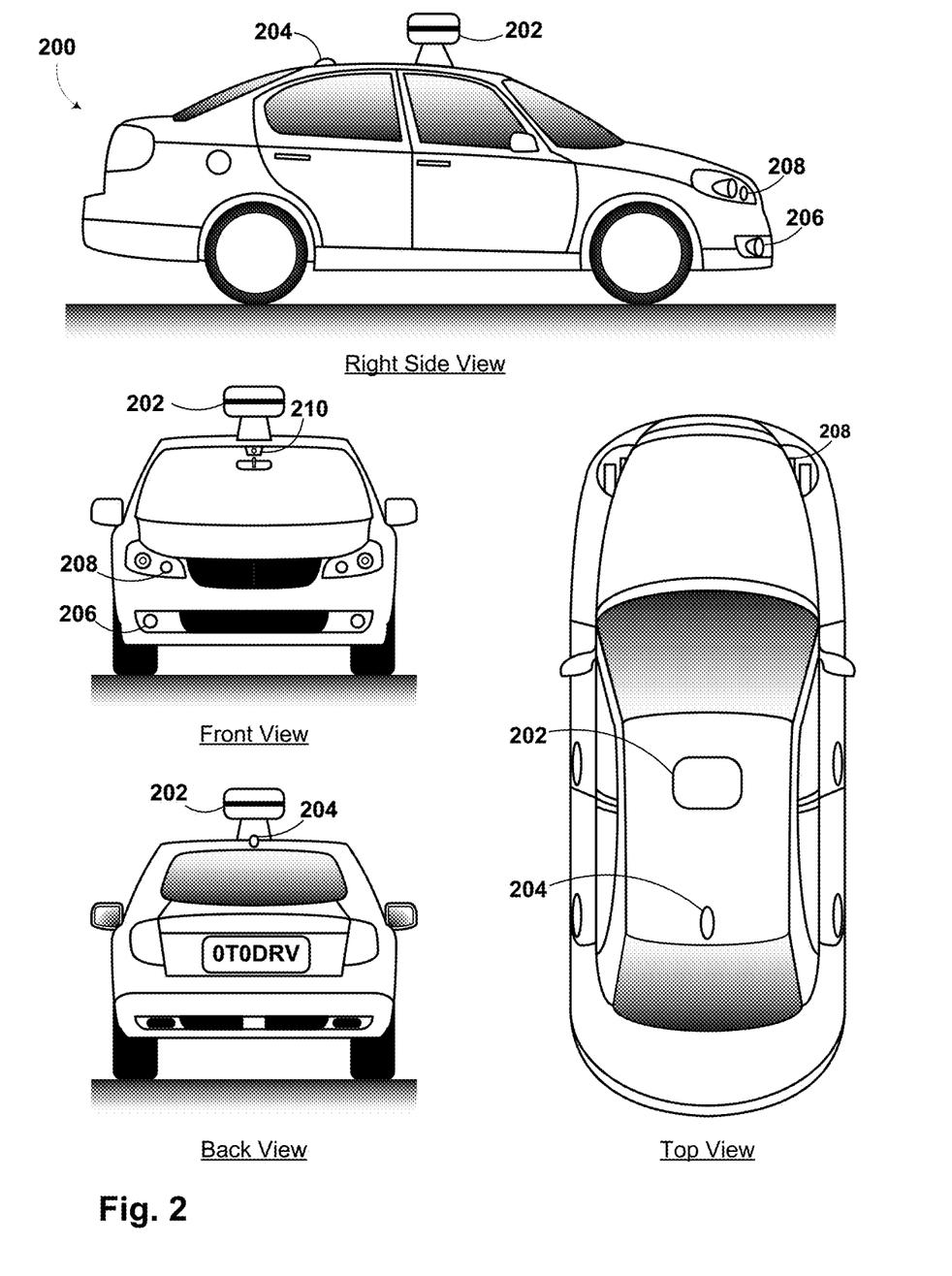
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radar 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radar 206 and laser rangefinder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
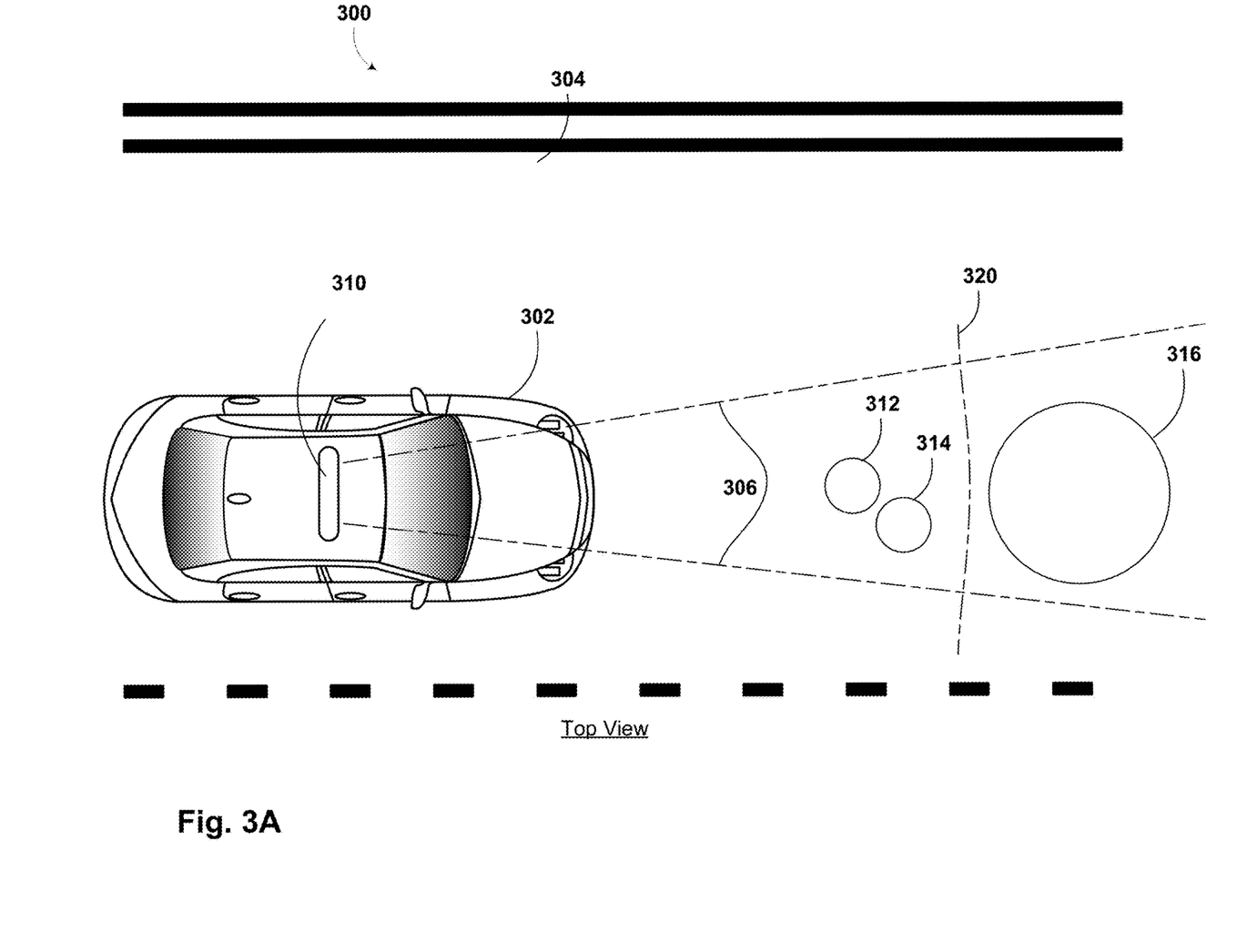
FIG. 3A is a top view of an autonomous vehicle operating scenario, according to an example embodiment.

FIG. 3A illustrates a scenario 300 involving a vehicle 302 traveling down a roadway 304. Vehicle 302 could be operating in an autonomous mode. Further, the vehicle 302 may be configured with a radar unit 310. The radar unit 301 may have an associated beam-width 306. In one example embodiment, there may be two desirable targets 312 and 314 in front of the vehicle 302. A first target 312 and a second target 314 may be within the beam-width 306 of the radar unit 310. Additionally, an undesirable target 316 may be within the beam-width 306 of the radar unit 310. For each target identified, a computer located within vehicle 302 may determine if each target is desirable or undesirable. Additionally, based on the determination of the desirable and undesirable targets, the computer may determine the range of interest. As shown in FIG. 3A, the range of interest may have a cutoff distance shown as cutoff limit 320. The radar system will ignore radar reflections that come from a distance further than cutoff limit 320. Thus, the radar system will ignore radar reflections from undesirable target 316.

Figure 3B:
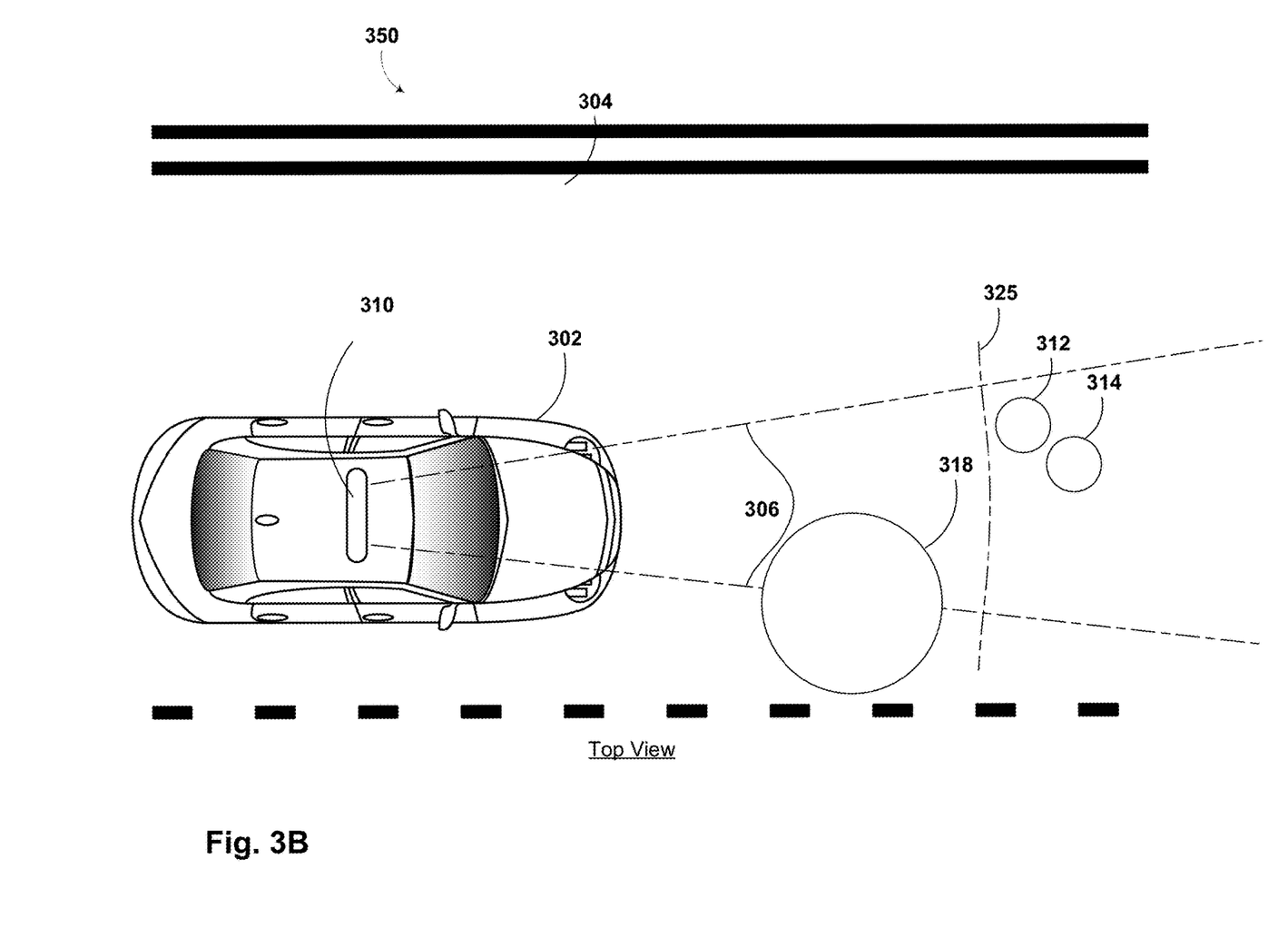
FIG. 3B is a top view of an autonomous vehicle operating scenario, according to an example embodiment.

FIG. 3B illustrates a scenario 350 involving a vehicle 302 traveling down a roadway 304. Similar to FIG. 3A, vehicle 302 could be operating in an autonomous mode and may be configured with a radar unit 310. Additionally, the radar unit 301 may have an associated beam-width 306. In one example embodiment, there may be two desirable targets 312 and 314 in front of the vehicle 302. A first target 312 and a second target 314 may be within the beam-width 306 of the radar unit 310. Further, an undesirable target 318 may be within the beam-width 306 of the radar unit 310. Like FIG. 3A, for each target identified, a computer located within vehicle 302 may determine if each target is desirable or undesirable. Additionally, based on the determination of the desirable and undesirable targets, the computer may determine the range of interest. As shown in FIG. 3B, the range of interest may have a threshold distance shown as limit 325. The radar system will ignore radar reflections that come from a distance less than threshold limit 325. Thus, the radar system will ignore radar reflections from undesirable target 318.

Figure 3C:
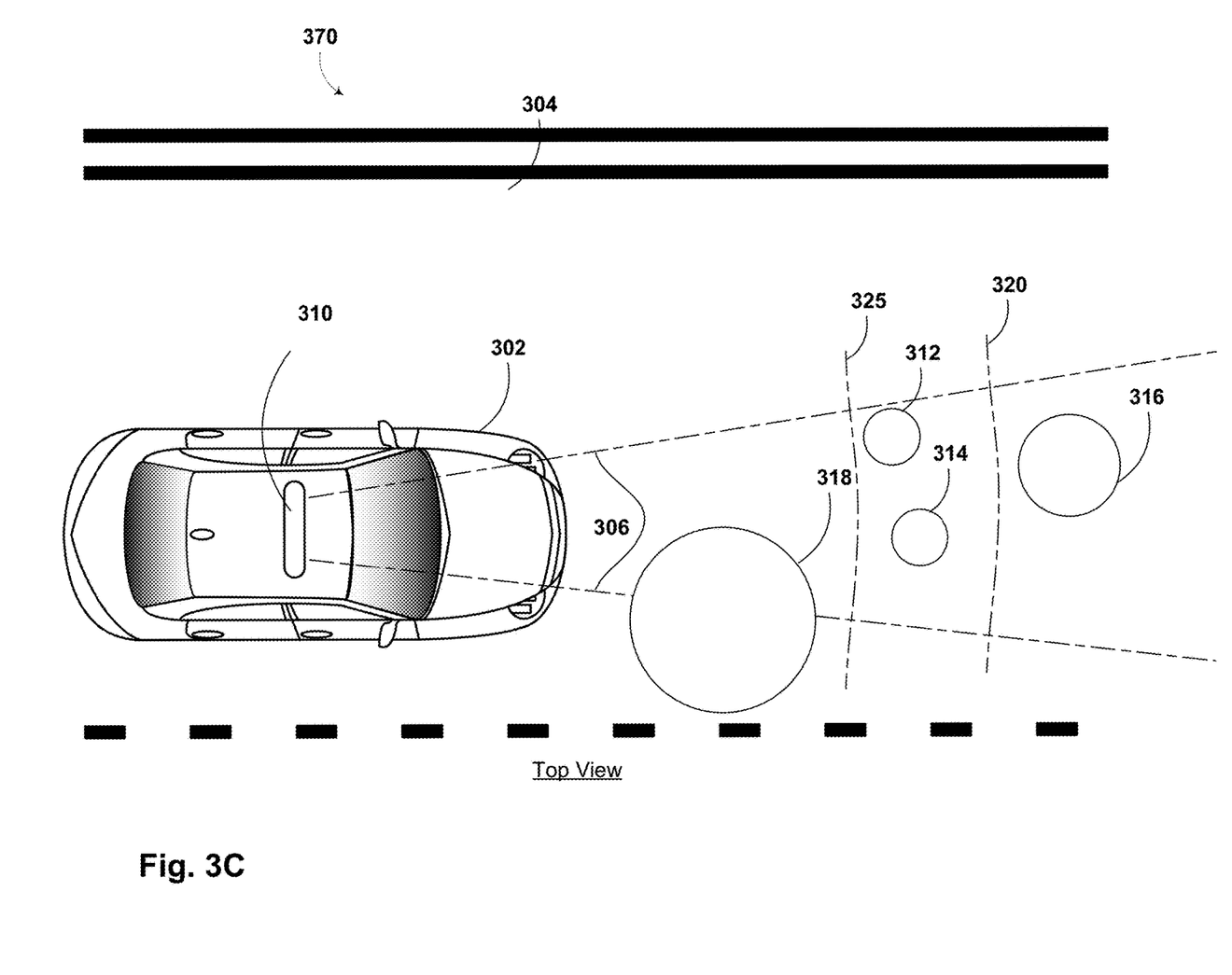
FIG. 3C is a top view of an autonomous vehicle operating scenario, according to an example embodiment.

FIG. 3C illustrates a scenario 370 involving a vehicle 302 traveling down a roadway 304. Similar to FIGS. 3A and 3B, vehicle 302 could be operating in an autonomous mode and may be configured with a radar unit 310. Additionally, the radar unit 301 may have an associated beam-width 306. In one example embodiment, there may be two desirable targets 312 and 314 in front of the vehicle 302. A first target 312 and a second target 314 may be within the beam-width 306 of the radar unit 310. Further, a first undesirable target 316 and a second undesirable target 318 may be within the beam-width 306 of the radar unit 310. Like FIGS. 3A and 3B, for each target identified, a computer located within vehicle 302 may determine if each target is desirable or undesirable. Additionally, based on the determination of the desirable and undesirable targets, the computer may determine the range of interest. As shown in FIG. 3C, the range of interest may have a cutoff distance shown as cutoff limit 320 and a threshold distance shown as limit 325. The radar system will ignore radar reflections that come from a distance less than threshold limit 325 and great than cutoff limit 320. Thus, the radar system will ignore radar reflections from both undesirable target 316 and undesirable target 318.

Figure 3D:
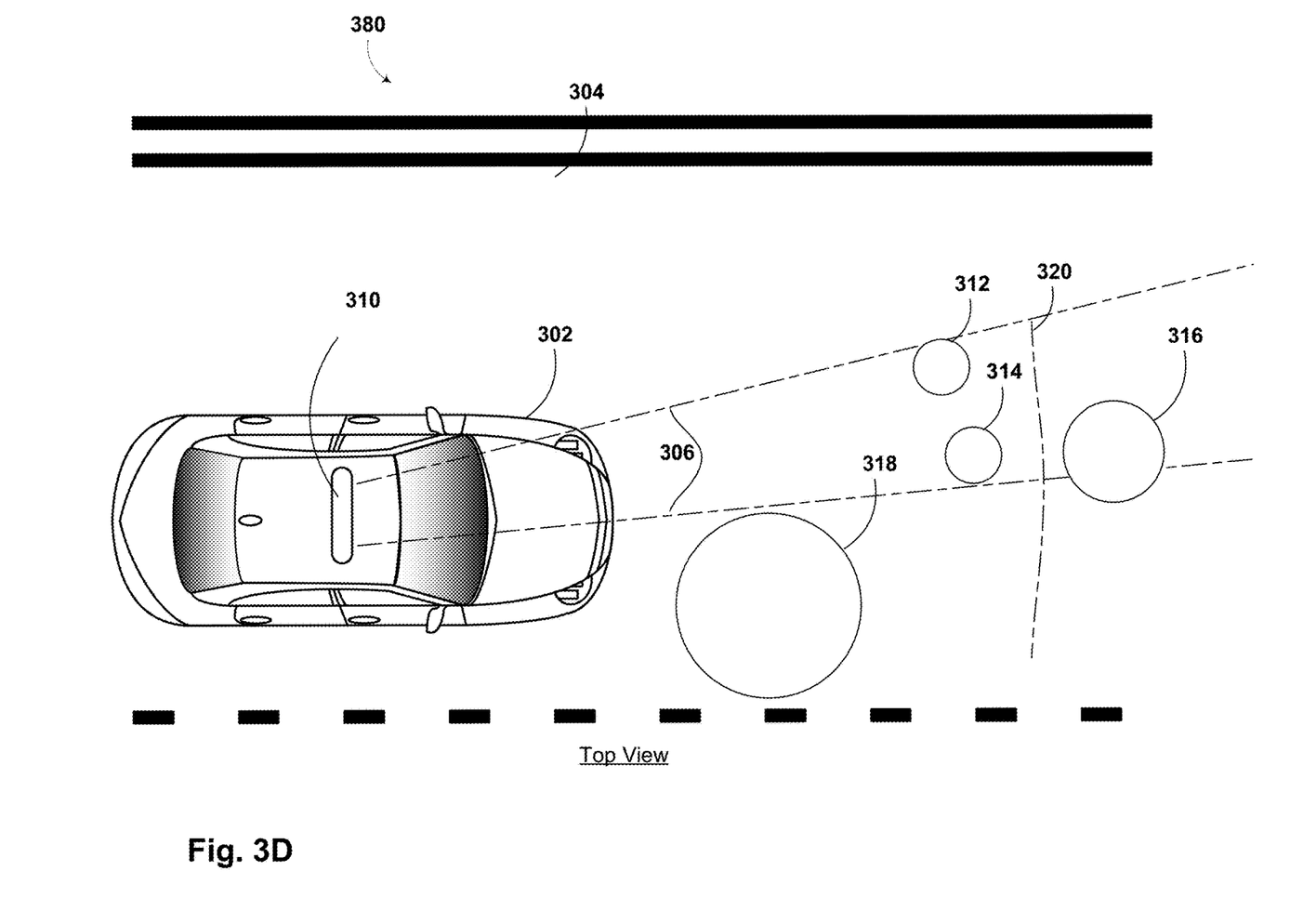
FIG. 3D is a top view of an autonomous vehicle operating scenario, according to an example embodiment.

FIG. 3D illustrates a scenario 380 involving a vehicle 302 traveling down a roadway 304. Similar to previous FIGS. 3A, 3B, and 3C, vehicle 302 could be operating in an autonomous mode and may be configured with a radar unit 310. Additionally, the radar unit 301 may have an associated beam-width 306. In one example embodiment, there may be two desirable targets 312 and 314 in front of the vehicle 302. A first target 312 and a second target 314 may be within the beam-width 306 of the radar unit 310. Further, scenario 380 may include a first undesirable target 316 and a second undesirable target 318. The second undesirable target 318 may be within the beam-width 306 of the radar unit 310. Like previous FIGS. 3A, 3B, and 3C, for each target identified, a computer located within vehicle 302 may determine if each target is desirable or undesirable. Additionally, based on the determination of the desirable and undesirable targets, the computer may determine the range of interest as well as an angle of interest.

As shown in scenario 380, the radar unit 310 may be able to steer the radar beam so the beam-width 306 avoids the first undesirable target 318. As shown in FIG. 3D, the range of interest may have a cutoff distance shown as cutoff limit 320. The radar system will ignore radar reflections that come from a distance greater than cutoff limit 320. Additionally, because the beam-width 306 avoids the first undesirable target 318, it will not contribute radar reflections. Thus, the radar system will ignore radar reflections from both undesirable target 316 and undesirable target 318.

3. Example Methods

Figure 4:
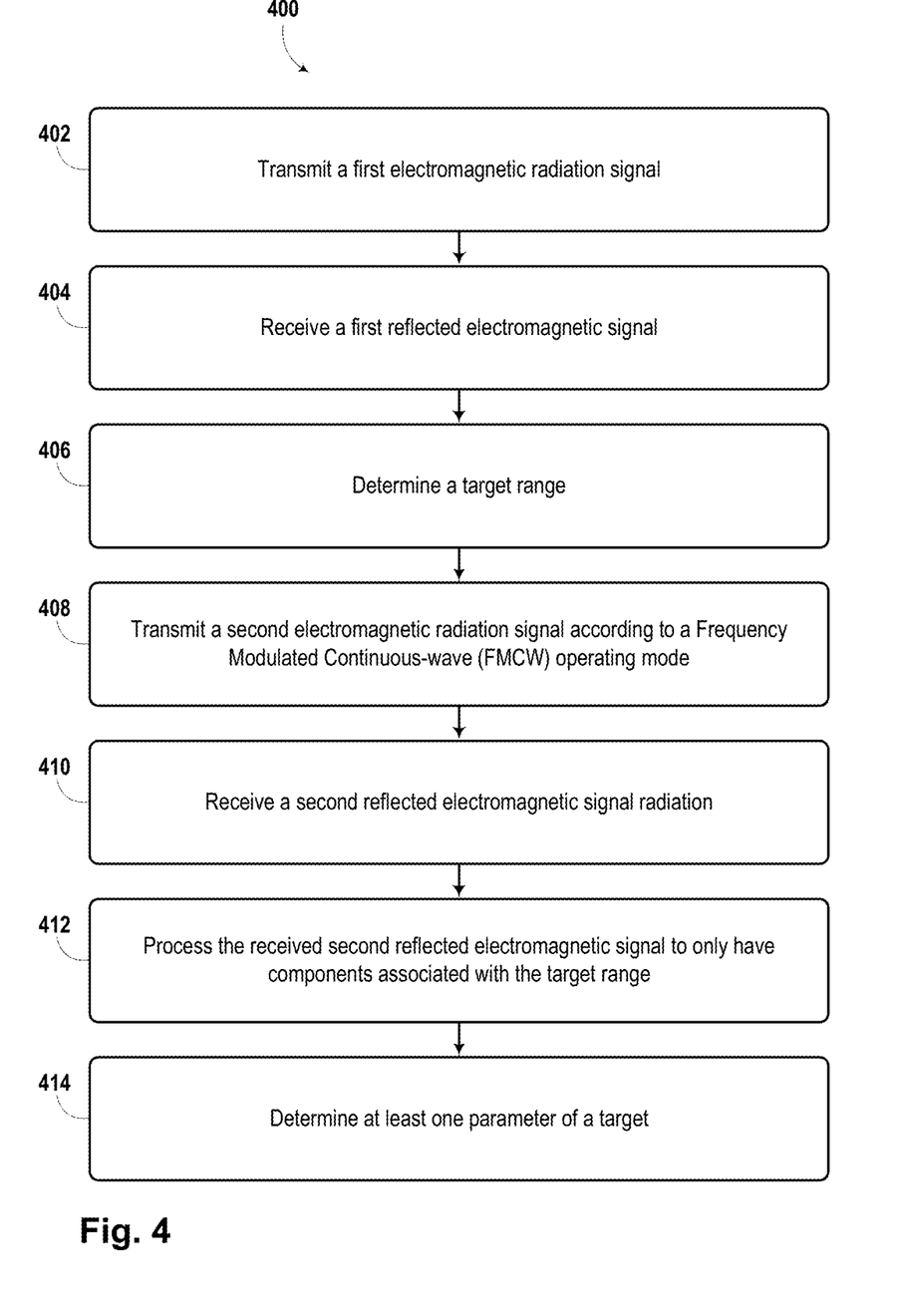
FIG. 4 shows a method, according to an example embodiment.

A method 400 is provided for operating a radar system of an autonomous vehicle in a range dwell mode. The method could be performed using any of the apparatus shown in FIGS. 1-3D and described above; however, other configurations could be used as well. FIG. 4 illustrates the blocks in an example method. However, it is understood that in other embodiments, the blocks may appear in different order and blocks could be added, subtracted, or modified. Additionally, the blocks may be performed in a linear manner (as shown) or may be performed in a parallel manner (not shown).

Block 402 includes the vehicle transmitting a first electromagnetic radiation signal from a radar unit. The electromagnetic signal may take the form of a radar signal. The vehicle described in this method could be the vehicle 100 and/or vehicle 200 as illustrated and described in reference to FIGS. 1 and 2, respectively. The first electromagnetic radiation signal may be transmitted via one or more antennas located in the radar unit. Further, the first electromagnetic radiation signal may be transmitted with one of many different radar modes. However, in some embodiments it is desirable to transmit the first electromagnetic radiation signal with a radar mode that allows the distance measurement of various reflecting objects in the field of view of the radar.

Block 404 includes the vehicle receiving a reflected electromagnetic radiation signal at a radar unit with an array of antennas. Receiving the reflected electromagnetic radiation signal could include receiving radio signals that are reflected from objects in the field of view of the radar system. A processor in the radar system may convert the received reflected electromagnetic radiation signals into data to relay for further processing. For example, the radar system may transmit a signal and receive a set of reflected signals back. The radar system may further identify distance and direction information to each object that causes reflections back to the vehicle. In some additional embodiments, the radar system may not be able to identify distance and direction information to each object, but rather the radar system may identify that reflected signals come from some objects. In some instances, objects may be positioned in a way that the radar system may not be able to identify each individual object at first. Depending upon the embodiment, the reflected signals may be processed fully or in part by a server and communicated to the vehicle.

Block 406 includes determining a target range. In some embodiments, a processor within the vehicle may determine the target range. However, in other embodiments, a server may calculate the target range fully or in part and communicate the target range to the vehicle. As previously described with respect to FIGS. 3A-3D, the target range may take several different forms. In some example embodiments, the target range may take the form of either one of or a combination of a maximum distance, a minimum distance, a range (between a maximum distance and a minimum distance), and an angle.

The target range may be determined based on various criteria. In one example, the radar reflections may indicate that there are numerous targets in the same area. This area may be considered a target range. Additionally, there may be a large object that reflects a significant amount of radar signal. The large object (such as the object represented by target 318 in FIGS. 3A-3D) may reflect a very large radar signal and obscure reflections from smaller objects located near the large object. Therefore, the target range may be determined to be a range that excludes the large object. In another example, an undesirable object may be located at an angle from the vehicle. The target range may be chosen to avoid the angle of the undesirable object.

The target range may be determined based on radar reflections or on input from other sensors. In one embodiment, a combination of vehicle sensors may be used to determine a target range. In some embodiments, the combination of sensors may not use the radar system at all. In embodiments where the radar system is not used to determine the target range, blocks 402 and 404 may be omitted from method 400. However, once the target range is determined, the radar system may be able to interrogate this target range.

Block 408 includes the vehicle transmitting a second electromagnetic radiation signal according to a Frequency-Modulated Continuous-wave (FMCW) operating mode via one or more antennas located in the radar unit. The FMCW operating mode is a specific form of transmitting a signal with a radar unit. One of the benefits of the FMCW operating mode is the ability to resolve accurate distance and speed information from each signal reflection when many are present.

When operating according to FMCW operating modes, the frequency of a signal transmitted by the radar system is transmitted with both (i) a frequency-modulation and (ii) a continuous-wave form. Transmitting with a frequency-modulation means that the frequency of the transmitted signal is varied over time. The method by which the frequency is varied can change based on the specific embodiment. For example, the frequency can be varied as a sine wave, a saw tooth wave, a triangle wave, or other form of frequency modulation. In one specific embodiment, the radar signal may have a base (carrier) frequency of approximately 77 gigahertz (GHz). The 77 GHz base signal may be mixed with a 60 megahertz modulation signal to produce the frequency-modulated signal. Continuous wave means that the radar signal is not sent in short bursts, but rather is transmitted for a duration of time that is long compared to the period of the electromagnetic wave.

In some additional embodiments, the FMCW radar signal may also be transmitted with an associated angle. The angle may be decided based on the target range determined at block 408. Additionally, the transmitted FMCW signal may be controlled based on the target range determined at block 408 as well.

Although the present disclosure is generally explained in the context of FMCW radar signals, other radar signally modes may be used within the present disclosure as well. For example, the present disclosure may also be used with stepped frequency radar, synthetic aperture radar, pulsed radar modes, and other radar modes.

Stepped frequency radar is a signaling mode in which the frequency of the the transmitted radar signal is increased or decreased in successive steps. In various examples of stepped frequency radar, the transmitted radar signal may be transmitted as a continuous wave or as a series of pulses. Further the frequency may be increased (or decreased) in a linear or non-linear steps in various examples. Step frequency radar may enable a radar system to have an increased range resolution while having a relatively low instantaneous bandwidth.

Synthetic aperture radar is a radar mode in which a radar signal is transmitted (usually in a plurality of pluses) by an antenna and received by at least one antenna at different locations for each pulse. For example, a vehicle in motion may transmit radar pluses and receive radar reflections as the vehicle is traveling along a roadway. As pulses are received while the vehicle is in motion, the pulses are processed together to obtain a higher resolution that what would be obtained with a fixed-location reception antenna. Therefore, the aperture (e.g. the area over which signals are received) is synthetically derived based on the motion of the vehicle.

Unlike continuous wave (CW) radar modes, pulsed radar modes transmit radar signals as pulses. For example, the radar system may repeatedly transmit a signal for a period of time and then transmit no signal for a second period of time. In some examples, a pulsed radar mode may also use the Doppler Effect (e.g. frequency shift) of received signals to determine a velocity for the objects that cause the reflections.

Block 410 includes the vehicle receiving a second reflected electromagnetic radiation signal at a radar unit with an array of antennas. Receiving the second reflected electromagnetic radiation signal could include receiving radio signals that are reflected from objects in the field of view of the radar system. The second reflected electromagnetic radiation signal may include reflections from objects based on the FMCW signal transmitted at block 408. A processor in the radar system may convert the second received radar signals into data to relay for further processing. Because the signals transmitted at block 408 are frequency-modulated, the second radar signal received may also be frequency modulated.

Block 412 includes processing the second reflected electromagnetic radiation signal to only have components in associated with the target range. A computer that is part of the autonomous vehicle may perform the processing at block 412. However, in another embodiment, a computer located on a network (i.e. not collocated as a part of the vehicle) may perform the processing at block 412.

The processing may be performed in several different ways. First, the processing may calculate the distance to each object causing reflections. In one embodiment, the time between the transmission of a specific frequency and the reception of the same frequency can determine the range to the object causing the reflecting. The distance to the specific object causing the reflection is equal to half the amount of time between transmission and reception ($\Delta t$) times the speed of light (c). The formula for the distance to a given reflector is below.

$$\text{distance} = \frac{\Delta t}{2} c$$

Additionally, the distance can also be calculated by comparing the frequency of the received signal to the frequency of the instantaneously transmitted signal. The distance to the reflector is equal to the difference in the frequency of the instantaneously transmitted signal and the received signal ($\Delta f$) is divided by two times the speed of light (c) divided by the change in frequency of the transmitter per unit time $$\left(\frac{df}{dt}\right).$$

Thus, the range of the radar can be controlled by changing the rate of change of the transmission $$\left(\frac{df}{dt}\right)$$

from the frequency-modulation. The formula for the distance to a given reflector is below.

$$\text{distance} = \frac{\Delta f}{2} \frac{c}{\frac{df}{dt}}$$

In still yet another embodiment, the processing may include mixing the second reflected electromagnetic radiation signal with the second reflected electromagnetic radiation signal with the first electromagnetic radiation signal. Thus, the signal received is mixed with the signal that is being transmitted. The output of the mixing may form a beat pattern. Each beat of the beat pattern corresponds to a reflecting object at a distance that corresponds to the frequency of the beat pattern.

These embodiments provide is the ability to select a given range for filtering through narrow band filter located before the analog to digital converter (ADC). By filtering out returns from the undesired ranges, two benefits are achieved. The first benefit is a reduction in the wideband noise power that is captured by the ADC due to the narrow band filter reducing the overall noise power that will be digitized. The second benefit is reducing the required dynamic range to digitize the signal of interest. If large targets are close to the system, and the range-dwell operation mode is set to process a longer range than those targets, the close in targets will be attenuated by the narrow band filter, while the desired ranges are minimally affected by the filter's insertion loss. This provides overall signal compression prior to the ADC that does not compress the desired signal. This means that the ADC's automatic gain control operation will be more heavily dominated by the desired range signal, instead of other returns in the scene.

Once the distances to the reflecting objects are calculated, the distances can be compared to the target range. Signals that correspond to regions outside of the target range can be removed by the processing system. Thus, objects that produce a reflection corresponding to a region that is not in the target region can be discarded by the processing system. The resulting signal would only contain signals that are produced by objects that are located within the target range.

Block 414 includes determining at least one parameter of a target object. Receiving the second reflected electromagnetic radiation signal could include receiving radio signals that are reflected from objects in the field of view of the radar system. The second reflected electromagnetic radiation signal may include reflections from objects based on the FMCW signal transmitted at block 408. A processor in the radar system may convert the second received radar signals into data to relay for further processing. Because the signals transmitted at block 408 are frequency-modulated, the second radar signal received may also be frequency modulated.

One difference between the range-dwell mode disclose herein and traditional FMCW radar is that only a small set of the spectral estimation algorithm would need to be executed because the expected beat frequencies of the targets would be known in advance. This simplifies processing substantially. Using an up-chirp and a down-chirp range-dwell mode waveform can also be used with the methods and system disclosed herein to provide further information on the velocity of the targets in the scene. This method would be similar to existing FMCW velocity/range estimation methods, but with the advantage of slightly altering the chirp rate to locate the beat frequencies at different spots in the narrow band filter profile.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may encompass a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

Figure 5:
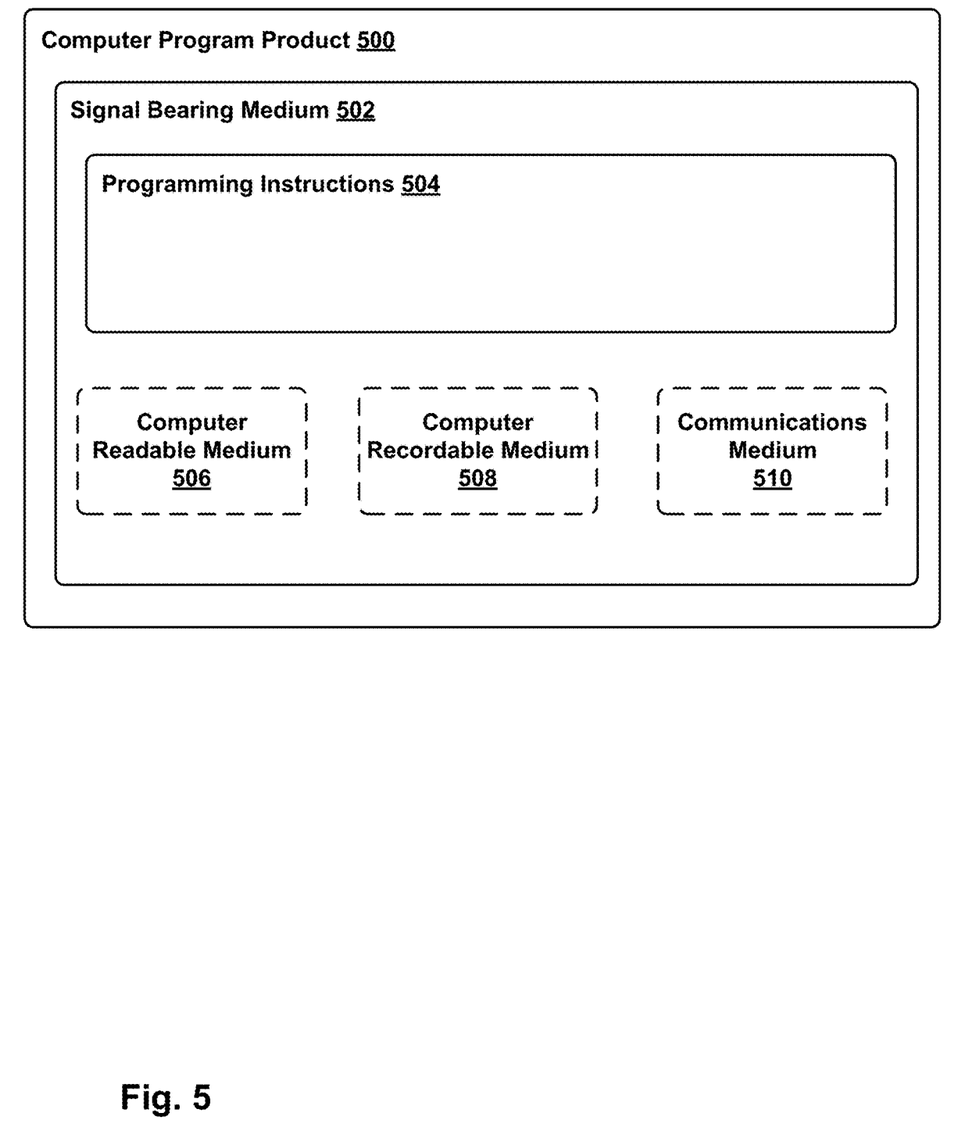
FIG. 5 is a schematic diagram of a computer program product, according to an example embodiment.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method for operating a radar system comprising:
    determining, by a processing unit, a range of interest based on one or more objects detected in an environment;
    receiving, by the processing unit, a reflected electromagnetic radiation signal that is based on an electromagnetic radiation signal transmitted by a transceiver of a radar unit; and
    responsive to the receiving of the reflected electromagnetic radiation signal, removing one or more components of the received electromagnetic radiation signal to generate a signal for subsequent processing, wherein the one or more components are associated with one or more ranges outside of the range of interest.

2. The method of claim 1, wherein the range of interest is associated with a cutoff distance, and wherein the removing of the one or more components of the received electromagnetic signal radiation comprises removing a portion of the received electromagnetic signal radiation received from a distance greater than the cutoff distance.

3. The method of claim 1, wherein the range of interest is associated with a threshold distance, and wherein the removing of the one or more components of the received electromagnetic signal radiation comprises removing a portion of the received electromagnetic signal radiation received from a distance less than the threshold distance.

4. The method of claim 1, wherein the range of interest corresponds to an angular sector of angles in which a reflecting object is located.

5. The method of claim 1, further comprising:
    mixing, by the processing unit, the received electromagnetic radiation signal with the transmitted electromagnetic radiation signal to generate a beat pattern; and
    determining a reflecting object in the range of interest based on the generated beat pattern.

6. The method of claim 1, wherein the electromagnetic radiation signal comprises a signal according to a frequency modulated continuous wave (FMCW) operating mode of the radar unit.

7. The method of claim 1, wherein the electromagnetic radiation signal comprises a signal according to a pulsed operating mode of the radar unit.

8. The method of claim 1, wherein the electromagnetic radiation signal comprises a signal according to a stepped frequency operating mode of the radar unit.

9. The method of claim 1, wherein the electromagnetic radiation signal comprises a signal according to a synthetic aperture radar operating mode.

10. The method of claim 1, wherein the receiving is performed with a plurality of antennas forming an array.

11. The method of claim 1, wherein the removing of the one or more components comprises removing the one or more components based on a frequency component of the reflected electromagnetic signal, wherein the one or more components are removed based on: (i) the frequency component of a corresponding portion of the reflected electromagnetic signal, (ii) a frequency component of a portion of the transmitted electromagnetic radiation signal, and (iii) a time delay.

12. The method of claim 1, wherein the radar unit is mounted on a vehicle.

13. The method of claim 1, further comprising an analog to digital converter, and wherein the processing unit is further configured to remove the one or more components before the received reflected electromagnetic signal is digitized by an analog to digital converter.

14. The method of claim 1, further comprising:
    determining, by processing the signal, at least one parameter of a target object in the range of interest, wherein the at least one parameter comprises at least one of a distance and an angle to the target object.

15. The method of claim 1, further comprising:
    determining, by the processing unit, the range of interest.

16. The method of claim 1, further comprising:
    detecting the one or more objects based on sensor data from a lidar or a camera.

17. The method of claim 1, wherein removing one or more components of the received electromagnetic radiation signal to generate the signal for subsequent processing comprises:
    removing the one or more components using a narrow band filter configured based on the range of interest, wherein the narrow band filter removes the one or more components before digitization of the signal by an analog to digital converter (ADC).

18. The method of claim 1, wherein the one or more objects includes a first object and a second object, and
    wherein determining the range of interest comprises:
    determining the range of interest such that the range of interest includes the first object and excludes the second object.

19. A radar system comprising:
    an antenna system configured to transmit and receive electromagnetic radiation;
    a transceiver configured to cause the antenna system to:
        transmit an electromagnetic radiation signal;
        receive a reflected electromagnetic signal radiation based on the transmitted electromagnetic radiation signal; and
    a processing unit configured to:
        determine a range of interest based on one or more objects detected in an environment;

receive the reflected electromagnetic radiation signal that is based on the electromagnetic radiation signal transmitted by the antenna system; and remove one or more components of the received electromagnetic radiation signal to generate a signal for subsequent processing, wherein the one or more components are associated with one or more ranges outside of the range of interest.

20. A vehicle system comprising:

a radar system comprising:

an antenna system configured to transmit and receive electromagnetic radiation;

a transceiver configured to cause the antenna system to:

transmit an electromagnetic radiation signal;

receive a reflected electromagnetic signal radiation based on the transmitted electromagnetic radiation signal; and a processing unit configured to:

determine a range of interest based on one or more objects detected in an environment;

receive the reflected electromagnetic radiation signal that is based on the electromagnetic radiation signal transmitted by the antenna system; and remove one or more components of the received electromagnetic radiation signal to generate a signal for subsequent processing, wherein the one or more components are associated with one or more ranges outside of the range of interest.

\* \* \* \* \*